Patented Sept. 11, 1951

2,567,285

UNITED STATES PATENT OFFICE 2,567,285

STERILIZATION AND CLARIFICATION OF
RAW WATERS

Harold R. Hay, Bryn Mawr, Pa., assignor to Philadelphia Quartz Company, Philadelphia, Pa., a corporation of Pennsylvania No Drawing. Application June 5, 1945,
Serial No. 597,721

14 Claims. (Cl. 210—23)

This invention relates to sterilization and clarification of raw waters; and it comprises a method of clarifying and purifying raw waters, for potable purposes for example, wherein a coagulation aid is produced by adding chlorine to a dilute solution of sodium silicate, having a ratio of $Na_2O$ to $SiO_2$ ranging from about 1:1 to 1:4, the chlorine added ranging preferably from about 0.7 to 2.0 mols per mol of $Na_2O$ present in the silicate solution, the resulting coagulation aid being then usually aged approximately to the point of incipient gel formation and advantageously diluted for stabilization purposes before being added to the raw water in conjunction with one of the usual coagulants. The invention also includes the process of forming the described coagulation aids; all as more fully hereinafter set forth and as claimed.

Several water purification processes have been developed within the past few years making use of so-called coagulation aids. One of the first of these processes to be used commercially employed a coagulation aid formed by adding sulfuric acid to a sodium silicate solution to a point somewhat short of neutralization, followed by aging to a point short of gelation and then dilution to produce stabilization. A second process involves the use of aluminum or iron salts to react with the silicate solution in the production of the desired coagulation aid. A third process, which is described in my copending application, Serial Number 508,857, filed November 3, 1943, now Patent No. 2,444,774, July 6, 1948, makes use of ammonium salts in the production of the coagulation aid. It is evident that each of these processes requires the purchase and use of chemicals in the production of the coagulation aid which are in addition to the sodium silicate as well as in addition to the chemicals employed as coagulants. There is an exception to this in the case of installations making use of the chloramine process of sterilizing water, in which case the ammonium sulfate, usually employed in making the chloramine, can be made to perform the double function of reacting with the sodium silicate to form the desired coagulation aid and also of producing the chloramine, as described in my acknowledged application.

In my copending application the procedure is mentioned of producing a coagulation aid by reacting chlorine with a sodium silicate solution in accordance with the following equations:

$$Na_2O \cdot 3.25SiO_2 + Cl_2 = NaOCl + 3.25SiO_2 + NaCl$$
$$NaOCl + Cl_2 + H_2O = 2HOCl + NaCl$$

I have found that the practical use of this new coagulation aid results in several surprising and highly valuable results.

I have found, for example, that, in water purifying installations employing the conventional pre-chlorination step, the chlorine used in this step can be employed in making my coagulation aid, with the pre-chlorination step being eliminated. The chlorine employed in the conventional pre-chlorination step is usually applied to the raw water before it passes into a coagulation or settling basin. One of its purposes is to sterilize the floc which eventually deposits in the settling basin. This floc, formed by the addition of coagulating chemicals, such as alum, iron salts and/or lime, carries down with it small animal life such as microbes and cysts, spores, bacteria etc. which may be present in the raw water along with suspended organic and inorganic matter. The settling of the floc produces a clarified water. But in the absence of the pre-chlorination step the settled mass frequently forms an active medium for the growth of bacteria and the putrefaction of organic solids. The foul odors produced thereby may contribute a distasteful factor to the purified water, at least at certain seasons, and gases given off may tend to re-suspend precipitated sediment. These conditions are alleviated by the use of a pre-chlorination step. Frequently in those installations in which the cost is considered somewhat too high to justify the use of a pre-chlorination step, the introduction of such a step would produce an appreciable improvement in the taste and odor of the clear water. Since the use of my new coagulation aid performs all the sterilizing functions of a pre-chlorinating step, it is therefore evident that my process is valuable even in installations which ordinarily do not employ pre-chlorination.

I have found, surprisingly, that when the chlorine used in a pre-chlorination step is employed in the making of a coagulation aid, substantially in accordance with the above equations, the sterilizing effect produced upon the subsequent addition of the coagulation aid to the water is at least as great and, in fact, is usually greater than that produced by the same amount of chlorine added in the conventional manner. In other words the sterilizing power of the chlorine is usually enhanced by its use in the production of my coagulation aid.

While the cause for this phenomenon has not been definitely established, it appears that it may be due to one or more of several different factors. First, a coagulation aid is supposed to contain micella of hydrous silica which form foci of precipitation during the formation of the floc in the coagulating basin. When chlorine is employed in the production of my coagulation aid, it is probable that the resulting micella of hydrous silica strongly adsorb chlorine and it is quite possible that this chlorine becomes trapped in the flocs as they form, resulting in a more thorough sterilization thereof. Second, it is possible that the micella of hydrous silica hinder the escape of the chlorine from the treated water. I have noted that the flocs, which are formed in my process after the addition of the coagulation aid and the coagulant, frequently have minute bubbles of gas attached thereto, especially when the quantity of chlorine used in making the aid is close to the upper end of the operative range. These bubbles are presumably either chlorine or possibly oxygen resulting from the decomposition of the hypochlorite formed in the process. The fact that these bubbles form on the flocs may tend to delay their escape from the water. Third, the silica in the coagulation aid may serve to stabilize and prevent decomposition of the sodium hypochlorite or hypochlorous acid formed in the process, possibly by removing or preventing the catalytic action of metal salts or other materials present in the water. But whatever the true explanation may be, the fact remains that the sterilizing action of the chlorine is usually enhanced when it is used in making my coagulation aid before being added to the water.

In view of the undiminished or increased sterilizing action of the chlorine used in production of my coagulation aid, it is evident that in any water purifying installations employing a pre-chlorination step, the cost of the chlorine used in making the aid can be entirely written off. And, since the addition of my coagulation aid reduces the quantity of chlorine required in the final chlorinating step, it is evident that this cost can be largely written off even in those installations in which no pre-chlorination step is generally used.

Another unexpected discovery is that the residual chlorine of raw water treated with my filter aid is not dissipated as rapidly as in the case of the same amount of chlorine used in the conventional pre-chlorination processes. The sterilizing factor is maintained for longer distances. The effect is somewhat like that obtained by the use of the chloramine treatment in comparison with the use of chlorine alone. The so-called "dead-end" troubles are reduced and the growth of bacteria and algae, such as asterionella (which produces a fishy odor) and crenothrix (which produces a very offensive decayed odor or taste in storage) is retarded or eliminated.

A still further surprising result obtained in my process is that flocculation is improved in comparison with the results obtained with the coagulation aid formed by the addition of sulfuric acid to a sodium silicate solution. The speed of formation of the floc is increased and the size of the floc formed is greater. This result was discovered in preliminary jar tests employing my coagulation aid and has been borne out in the practical operation of my method. This result seems to be contrary to the accepted theory that divalent ions, such as the sulfate ion, produce better coagulation than monovalent radicals, such as the chloride ion.

My method also has the advantage that better results are obtained in the treatment of colored raw waters. My coagulation aid is an effective color-removing agent, presumably due to the bleaching effect produced by the hypochlorite formed in the aid. The decolorizing effect is greater than that produced with the same quantity of chlorine. This is probably due to the stabilizing effect of the silicate on the hypochlorite.

My new coagulation aid can be added to the raw water in the same way as the aids of the prior art, that is, prior to the entrance of the water into a coagulation or settling basin and either before or after the addition of the usual coagulants used in the process. I usually prefer to add the aid prior to the coagulant when using the aid in conjunction with clarification or the line softening of water. When the aid is used for the reduction of color and/or turbidity, it is best to add the aid after the coagulant.

In the making of my aid it is usually advantageous to pass the chlorine into a dilute silicate solution, which has a ratio of $Na_2O$ to $SiO$ of from 1:1 to 1:4 with a $SiO_2$ concentration preferably ranging from about 0.3 to 5.0 per cent by weight, but it is possible to chlorinate the water used for diluting the silicate first and then to add a sufficient amount of a concentrated silicate solution to produce the desired concentration, provided that adequate agitation is provided. When an aging period is employed, best results are obtained when the aid is aged for a period which is approximately from one to 95 per cent of its gel induction period, the gel induction period being defined as that period between the addition of the chlorine and the formation of a gel. After aging, unless the aid is to be added promptly to the raw water, it should be diluted to extend its life. This dilution should be at least sufficient to produce a concentration not exceeding about 1 per cent by weight. Of course, the smaller this dilution the smaller the tanks required, but the shorter the life of the diluted aid.

It will be noted that somewhat smaller tanks can be used in the making of my aid than in the case of the aid formed with sulfuric acid, in which method the aid is formed by adding acid to a silicate solution whose $SiO_2$ concentration is about 1.5 per cent, the mixture being then diluted to a concentration of about 0.6 per cent $SiO_2$ or less. If a continuous process is employed in making the aid and adding it to the raw water, it is usually not necessary to dilute it, although, of course, dilution can also be accomplished continuously, if desired.

It is advantageous to add sufficient chlorine to the silicate solution so that the molecular ratio of $Cl_2$ to $Na_2O$ is at least about 0.7 to 1. The upper limit of chlorine addition depends upon several factors. The gel induction periods of my coagulation aids decrease from the point representing 70 per cent neutralization as the ratio of $Cl_2$ to $Na_2O$ is increased but the rate of this decrease falls off as the theoretical neutral point is passed and finally, at ratios above about 2.0 to 1, the gel induction periods increase to the point at which the mixture is substantially saturated with chlorine. At the upper ranges the excess of chlorine appears to exert a stabilizing effect on the silica sol. For practical purposes, however, I consider ratios of $Cl_2$ to $SiO_2$ within the range of about 0.7 to 1 to 2.0 to 1 to be the most useful. It appears that better coagulation results from the use of coagulation aids within this more limited range. However, improvement in coagulation can be obtained throughout a range extending from about 0.2 $Cl_2$ to 1 $Na_2O$ up to mixtures substantially saturated with chlorine. An aid in which about 1.2 mols of chlorine are added per mol of $Na_2O$, when $SiO_2$ is present to about 2.25 weight percent, for example, has a life before gelation of only about 3-5 minutes. This represents about the minimum practical gel induction period to employ. The pH of the coagulation aids, as determined with the glass electrode, for example, may vary between about 11 and 3.

In comparison, in the case of the coagulation aid produced by the addition of sulfuric acid to a sodium silicate solution, the latter can not be neutralized beyond about 85 per cent at concentrations higher than 1.5 per cent by weight of $SiO_2$, since otherwise gel formation is likely to occur before dilution can be effected. For best results the alkalinity of this aid must lie between the narrow limits of 1150 to 1250. It will be noted that, in the production of my new aid this close control is not required, which is an important advantage. This results because one of the products of the initial neutralization is an alkaline salt. My aid can be prepared at a substantially lower pH than is possible in the case of other aids.

It is evident from the above description that my process combines the two steps of pre-chlorination and the use of a coagulation aid without elimination of the function of either step and, in fact, with enhancement of the effect produced by pre-chlorination. It is also evident that in my new process the coagulation aid has an important auxiliary function, which is in contrast to other processes making use of such aids.

Of course the optimum aging period, the optimum ratio of chlorine to silicate solution, the optimum concentrations of the solutions and the optimum quantity of the aid to be added to the raw waters, varies to some extent with the water to be treated. The water is of course affected by the season of the year, the weather conditions etc. These optimum conditions can be determined by simple tests. The so-called jar tests, which are commonly used in water works practice, are useful in determining these factors. The jar tests, for example, are suitable for determining the quantity of coagulation aid to be added to the raw water for the production of optimum results. It will usually be found that this quantity is within the range of 1 to 15 P. P. M. of $SiO_2$.

My invention can be described in somewhat greater detail by reference to the following specific examples which illustrate the use of my method in actual practice.

Example 1

A standard laboratory clarification test was conducted upon a raw water made by adding sufficient inert clay to city tap water to produce a turbidity of 60 parts per million. The clay was added to increase the accuracy of the measurement of floc formation. Liter samples of this raw water were treated in a beaker equipped with a stirring device rotating 32 times a minute.

In the first test the coagulation aid was produced by taking 20 parts by volume of a sodium silicate solution having a weight ratio $1Na_2O:3.22SiO_2$ and an $Na_2O$ concentration of 3.1 weight per cent, diluting it with 180 parts of water and then bubbling in chlorine until 99.5 per cent of the alkali was neutralized, as shown by titration with sodium thiosulfate, the addition of the chlorine taking 12 minutes. The resulting coagulation aid was aged for a period of 65 minutes after which it was diluted to 0.5 per cent $SiO_2$. This aged and diluted coagulation aid was added to the raw water in quantity sufficient to produce 3 P. P. M. of $SiO_2$ in the latter. Alum was then added in the amount of 10 P. P. M. The first floc appeared in 1.5 minutes and floc formation was complete in about 7.0 minutes. The flocs formed were very large and heavy, settling within about 2 minutes after the stirrer was stopped.

Comparative tests were made using alum alone, a coagulation aid produced by adding sulfuric acid to the same silicate solution and a coagulation aid produced by adding alum to the silicate solution. It was found that none of these methods produced flocs as rapidly, as large or as quickly as in the case of my new coagulation aid. The comparative results obtained are collected in the following table:

| Coagulant aid | $SiO_2$ P. P. M. | Floc Appearance Min. | Floc Complete Min. | Rate Settling | Size, mm. |
|---|---|---|---|---|---|
| None (Alum alone) | | 8 | 21 | Fair | 1 |
| $H_2SO_4$ | 3 | 3 | 11 | Very good | 4 |
| $Al_2(SO_4)_3$ | 2 | 4 | 13 | do | 4 |
| $Cl_2$ | 3 | 1.5 | 7.0 | Excellent | 8 |

Example 2

In this example the same tap water was treated with a coagulation aid made by diluting 30 parts by volume of the same silicate solution used in Example 1 with 170 parts of water, thereby producing a solution containing 1.5 per cent $SiO_2$. Chlorine was added over a period of 20 minutes until the alkali was 102 per cent neutralized, as determined by titration. The resulting coagulation aid was aged for 16 minutes, corresponding to about 84 per cent of the solution life (gel induction period), after which it was diluted to 0.5 per cent silica. This aid was added to the raw water and then alum was added in the amounts indicated in Example 1. In this test the first floc formation was noted in 2 minutes. Floc formation was complete in 8 minutes and it required only 3 minutes for the floc to settle after the stirrer was turned off. The results produced were therefore slightly inferior to those obtained in Example 1. In this test it was noted that tiny gas bubbles tended to form on the floc and on the stirrer but these bubbles did not interfere appreciably in the subsidence of the floc.

*Example 3*

In this example a solution of the same silicate containing 1.5 per cent $SiO_2$ was neutralized to the extent of 85 per cent, as determined by titration. This corresponds to an end point of from 12.6–12.8 ml. of a 0.1N sodium thiosulfate solution in the titration of an acidified 10 ml. sample, using a potassium iodide-starch solution as indicator. A coagulation aid produced in this manner has a solution life of from 24 to 30 hours at 20° C. From one to two hours of aging produces a satisfactory coagulation aid. In this particular test the aid was aged for 2 hours, then diluted to 1 per cent $SiO_2$ for stabilization purposes. Upon addition to the same raw water it was found to produce excellent clarification with results comparable to those produced in Example 1.

*Example 4*

In this test a flow of river water amounting to five million gallons per day was treated. The coagulation aid was prepared and added continuously by first diluting a sodium silicate solution, having a weight ratio of $1Na_2O:3.22SiO_2$, to a concentration of 1.5 per cent $SiO_2$, adding chlorine from a special chlorinator at the rate of 2.34 pounds per hour, thereby neutralizing about 95 per cent of the $Na_2O$, aging for a period of 5 minutes, diluting to 0.5 per cent $SiO_2$ and then feeding this coagulation aid to the raw water at a rate supplying 4 P. P. M. of $SiO_2$, in conjunction with a feed of alum amounting to 12 P. P. M. Excellent clarification was produced in this test, substantially better than that produced in a comparative test using a coagulation aid formed by partially neutralizing the same sodium silicate solution with sulfuric acid. The flocs formed were very large and settled rapidly. The sludge was found to be effectively sterilized as well as the effluent water.

While I have described what I consider to be the most advantageous embodiments of my process, it is evident, of course, that many modifications can be made in the specific procedures described without departing from the purview of this invention. While I have mentioned the use of alum, (aluminum sulfate) iron salts and lime as coagulants to be used in conjunction with my coagulation aids, any coagulating chemical, which is capable of forming an insoluble precipitate when reacted with a sodium silicate solution, is applicable. As mentioned previously, in the case of some waters it is possible to dispense entirely with the use of coagulants in addition to my coagulation aid. It is also possible in some cases to employ all the chlorine required for sterilization purposes in the making of my coagulation aid. These procedures result, of course, in a substantial simplification of the clarifying process.

While I have indicated that aging of my coagulation aids is usually required for best results, considerable improvement in coagulation can be obtained when these aids are added to the raw water without special provision for an aging period, for example, in conjunction with lime softening in which no alum is used. The aid produced in Example 3, for example, can be added directly to the water without aging and, if it is consumed before the end of its induction period, that is, before gelation, it is not necessary to dilute this aid to stabilize it. In effect, the dilution caused by adding it to the raw water produces stabilization. Aids having very short induction periods can be employed provided that they are produced and added to the raw water continuously without gel formation taking place.

A simple way to conduct the addition of the coagulation aid with the use of a minimum aging period is to provide a flowing stream of a dilute silicate solution, having a concentration ranging from about 0.5 to 15 per cent by weight, for example, agitating and chlorinating this stream to the state of incipient gel formation or to the point at which a sample of the chlorinated mixture, if allowed to stand, will form a gel within a period of about 3 to 30 minutes, and then passing it into the raw water. Agitation and chlorination can be accomplished either in a launder or a tank. If a tank is used this may be of sufficient size to provide a retention time which would be a small fraction of the gel induction period.

When proceeding on the batch basis the chlorine can be passed into the silicate solution rather slowly so that the solution is aged when chlorination is completed. Completion of the chlorination can be determined by titration, by following the increase in viscosity, by measuring the pH or by determining the time required for subsequent gel formation. When titration is employed the chlorine should be added until from about 0.7 to 1.5 mols of chlorine have been added per mol of $Na_2O$ present in the silicate. When pH is employed as a control, the chlorine should be added until the pH is within the range of about 3 to 11. And when gel formation is used as a test, the chlorine should be added until the mixture is in the state of incipient gel formation or until the mixture, if allowed to stand, would form a gel within a reasonable period of time. In all cases the proper amount to be added is that required to cause the formation of a silica sol which has a tendency to gel after an induction period of from about 3 minutes to 300 hours. As stated previously this silica sol is advantageously aged to the point of incipient gel formation or for a period representing from about 1 to 90 per cent of the induction period, following which the aid is either added directly to the raw water or is diluted for stabilization purposes prior to being added to the water. In general it can be said that, the more dilute the silicate solution the more chlorine required to produce the coagulation aid, and vice versa. For example, a silicate solution having a concentration of from about 5 to 10 per cent $SiO_2$ would require neutralization only to about 20 per cent, while in the other direction a silicate solution having a concentration of only 0.3 per cent would require neutralization to the extent of from about 150 to 200 per cent. Up to the point of about 120 per cent neutralization, the addition of a small additional amount of chlorine is, in some respects, equivalent to the use of an aging period, that is, the additional chlorine shortens the gel induction period. If desired, the chlorine may be added in the form of a solution of hypochlorous acid or chlorine water.

It is believed that the above directions are sufficient to enable anyone skilled in the water treating art to produce coagulation aids which would be effective in the treatment of all natural waters which can be classed as of the common or usual type. This includes the treatment of sewage as well as industrial wastes, such as paper mill wastes, the precipitation of suspended pigments and other liquors. In practically all cases wherein industrial liquors are being clarified with the aid of conventional coagulants, improved results can be obtained with the use of my coagulation aid.

Other alkali metal silicates, such as potassium silicate, can be employed in place of sodium silicate in my invention but this is merely of academic interest owing to the high cost of other silicates. Other modifications of my process which fall within the scope of the following claims will be immediately evident to those skilled in this art.

What I claim is:

1. In the manufacture of coagulation aids for use in clarifying raw waters, the process which comprises adding sufficient chlorine to a dilute aqueous sodium silicate solution, having a weight ratio of $Na_2O$ to $SiO_2$ ranging from about 1:1 to 1:4 and a concentration of about 0.5 to 15 per cent by weight to produce a mixture which is in the state of incipient gel formation, then diluting the solution with water to stabilize it and to prevent gel formation prior to use.

2. The process of claim 1 wherein the coagulation aid is diluted by adding it to a raw water to be clarified.

3. The process of claim 1 wherein the chlorine is added until the molecular ratio of chlorine to the $Na_2O$ of the sodium silicate is within the range of about 0.7:1 to 2.0:1.

4. The process of claim 1 wherein the sodium silicate solution after dilution has a concentration ranging from about 0.3 to 5 per cent $SiO_2$ by weight.

5. The process of claim 1 wherein chlorine is added until the mixture will form a gel, if permitted to stand, within a period of about 3 minutes to 300 hours.

6. The process of claim 1 wherein the silicate solution is chlorinated and then aged until in the state of incipient gel formation before the dilution step.

7. In the manufacture of coagulation aids for use in sterilizing and clarifying raw waters, the process which comprises adding chlorine to a dilute aqueous sodium silicate solution, having a ratio of $Na_2O$ to $SiO_2$ within the range of about 1:1 to 1:4 and a concentration ranging from about 0.5 to 15 per cent by weight, in quantity amounting to from about 0.7 to 1.5 mols of $Cl_2$ per mol of $Na_2O$ present sufficient to produce a mixture which can be aged to produce a state of incipient gel formation, aging the resulting mixture until it is in the state of incipient gel formation and diluting to prevent gel formation prior to use.

8. In the manufacture of coagulation aids for use in sterilizing and clarifying raw waters, the process which comprises adding chlorine to a dilute aqueous sodium silicate solution, having a ratio of $Na_2O$ to $SiO_2$ within the range of about 1:1 to 1:4, and a concentration ranging from about 0.5 to 15 per cent by weight, the quantity of chlorine added being from about 0.7 to 1.5 mols per mol of $Na_2O$ present sufficient to produce a mixture which can be aged to produce a state of incipient gel formation, aging the resulting mixture to the extent of about 1 to 95 per cent of its gel induction period and diluting with water to stabilize the resulting coagulation aid.

9. In the sterilization and clarification of raw waters, the process which comprises adding to the raw water a small amount of a water soluble coagulant which is capable of forming an insoluble precipitate when reacted with a silicate solution and, prior to the coagulation, adding to the water a small amount of a coagulation aid formed by adding sufficient chlorine to a dilute aqueous sodium silicate solution, having a ratio of $Na_2O$ to $SiO_2$ within the range of about 1:1 to 1:4 and a concentration ranging from about 0.5 to 15 per cent by weight, to produce a mixture in the state of incipient gel formation, and removing the resulting precipitate from the water.

10. In the sterilization and clarification of raw waters, the process which comprises making a coagulation aid by adding chlorine to a dilute aqueous sodium silicate solution, having a ratio of $Na_2O$ to $SiO_2$ ranging from about 1:1 to 1:4 and a concentration ranging from about 0.5 to 15 per cent by weight, the amount of chlorine added amounting to from about 0.7 to 1.5 mols per mol of $Na_2O$ present in the silicate solution and being sufficient to produce a tendency for the mixture to form a gel after a short induction period, then prior to the end of said induction period, diluting it to prevent gel formation, adding the resulting coagulation aid to the water and also adding any coagulant required to produce the formation of a voluminous floc, said coagulant being one capable of forming an insoluble precipitate when reacted with a sodium silicate solution, then removing the said floc from the water.

11. The process of claim 10 wherein the mixture is aged to an extent representing from about 2 to 10 per cent of said induction period.

12. In the process of sterilizing and clarifying raw waters, the process which comprises passing into a stream of raw water a stream of a dilute aqueous sodium silicate solution having a concentration of from about 0.5 to 15 per cent by weight to which chlorine has been added in quantity sufficient, if the mixture were allowed to stand, to produce the formation of a gel within a period of from about 3 minutes to 300 hours, also adding any coagulant required to produce the formation of a voluminous floc, said coagulant being one selected from a class consisting of alum, aluminum sulfate, water soluble iron salts and lime and capable of forming a precipitate with a sodium silicate solution, and separating the floc from the water.

13. In the process of sterilizing and clarifying raw waters, the process which comprises preparing a dilute aqueous sodium silicate solution having a ratio of $Na_2O$ to $SiO_2$ ranging from about 1:1 to 1:4 and a concentration ranging from about 0.3 to 5 per cent $SiO_2$ by weight, adding chlorine to said solution until it is in the state of incipient gel formation and then, before gel formation takes place, adding it to a raw water in addition to any coagulant required to form a voluminous flocculent precipitate, said coagulant being one selected from a class consisting of alum, aluminum sulfate, water soluble iron salts and lime and capable of reacting with a sodium silicate solution to produce a precipitate and separating said precipitate from said water.

14. In the process of sterilizing and clarifying raw waters, the process which comprises forming a coagulation aid by adding chlorine to a dilute aqueous sodium silicate solution, having a ratio of $Na_2O$ to $SiO_2$ within the range of about 1:1 to 1:4 and a concentration of from about 0.3 to 5 per cent $SiO_2$ by weight, the amount of chlorine added being from about 0.7 to 1.5 mols per mol of $Na_2O$ present, aging the resulting mixture for a period equal to from about 1 to 90 per cent of its gel induction period, diluting the aged mixture by adding sufficient water to stabilize it, adding the so-produced aged and stabilized coagulation aid to a raw water and also adding to the water a sufficient amount of a coagulant, which is selected from a class consisting of alum, aluminum sulfate, water soluble iron salts and lime and capable of producing a precipitate when reacted with a sodium silicate solution, to produce a voluminous flocculent precipitate, and removing said precipitate from the water.

HAROLD R. HAY.

REFERENCES CITED

The following references are of record in the file of this patent:

UNITED STATES PATENTS

| Number | Name | Date |
|---|---|---|
| 26,072 | Lovis | Nov. 8, 1859 |
| 1,620,332 | Evans | Mar. 8, 1927 |
| 1,653,272 | Green et al. | Dec. 20, 1927 |
| 1,834,783 | Johnson | Dec. 1, 1931 |
| 2,234,285 | Schworm et al. | Mar. 11, 1941 |
| 2,287,486 | Reichelt et al. | June 23, 1942 |
| 2,310,009 | Baker | Feb. 2, 1943 |
| 2,317,961 | Tschirner | Apr. 27, 1943 |
| 2,338,987 | Watzel | Jan. 11, 1944 |
| 2,370,472 | King | Feb. 27, 1945 |
| 2,370,473 | King | Feb. 27, 1945 |

Certificate of Correction

Patent No. 2,567,285 September 11, 1951

HAROLD R. HAY

It is hereby certified that error appears in the printed specification of the above numbered patent requiring correction as follows:

Column 4, line 26, for "line" read *lime*; line 31, for "SiO" read *SiO₂*; column 5, line 11, for "exteding" read *extending*;

and that the said Letters Patent should be read as corrected above, so that the same may conform to the record of the case in the Patent Office.

Signed and sealed this 1st day of January, A. D. 1952.

[SEAL]

THOMAS F. MURPHY,
*Assistant Commissioner of Patents.*